(12) United States Patent
Kang et al.

(10) Patent No.: US 7,868,644 B2
(45) Date of Patent: Jan. 11, 2011

(54) APPARATUS AND METHOD FOR INSPECTING LIQUID CRYSTAL DISPLAY

(75) Inventors: Dong Woo Kang, Gumi-si (KR); Soung Yeoul Eom, Gumi-si (KR); Bong Chul Kim, Daegu-si (KR); Ki Soub Yang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/536,067

(22) Filed: Aug. 5, 2009

(65) Prior Publication Data

US 2009/0290785 A1    Nov. 26, 2009

Related U.S. Application Data

(62) Division of application No. 11/443,663, filed on May 30, 2006, now Pat. No. 7,586,323.

(30) Foreign Application Priority Data

Aug. 30, 2005    (KR)    ............... 10-2005-0080043

(51) Int. Cl.
    *G01R 31/00*    (2006.01)
(52) U.S. Cl. ...................................... 324/770
(58) Field of Classification Search ............. 324/770, 324/763, 765, 158.1; 349/351, 74, 142, 5, 349/40, 48; 257/48; 382/149
See application file for complete search history.

(56) References Cited

U.S. PATENT DOCUMENTS

| 5,459,410 A | * | 10/1995 | Henley ................. 324/770 |
| 5,793,221 A | | 8/1998 | Aoki |
| 6,973,209 B2 | * | 12/2005 | Tanaka ................. 382/149 |

* cited by examiner

*Primary Examiner*—Ha Tran T Nguyen
*Assistant Examiner*—Tung X Nguyen
(74) *Attorney, Agent, or Firm*—Brinks Hofer Gilson & Lione

(57) ABSTRACT

A liquid crystal display (LCD) inspection apparatus and method are provided. The inspection apparatus and method are capable of automatically and accurately detecting defects of an LCD panel, and providing information of the automatically-detected defects of the LCD panel to the operator, thereby enabling the operator to easily recognize the defects.

9 Claims, 8 Drawing Sheets

APPARATUS AND METHOD FOR INSPECTING LIQUID CRYSTAL DISPLAY

RELATED APPLICATIONS

This application is a divisional of U.S. patent application Ser. No. 11/443,663, filed on May 30, 2006 now U.S. Pat. No. 7,586,323 which claims the benefit of Korean Patent Application No. 10-2005-080043, filed on Aug. 30, 2005, which is hereby incorporated by reference as if fully set forth herein.

BACKGROUND

1. Field of the Invention

The present invention relates to an apparatus that inspects a panel of a liquid crystal display (LCD.

2. Discussion of the Related Art

Generally, LCD inspection apparatuses are adapted to easily inspect, with the naked eye, whether or not an LCD panel is defective.

FIGS. 1 and 2 illustrate a conventional LCD inspection apparatus. As shown in FIGS. 1 and 2, the conventional LCD inspection apparatus includes a body 1, an inspection stage 2 which is arranged at one side of the body 1, to perform an inspection of an LCD panel 10, to be inspected, and a loading/unloading stage 7 which is arranged at the other side of the body 1, to load the LCD panel 10, to be inspected, in the inspection stage 2, and to unload the inspected LCD panel 10 from the inspection stage 2.

As seen in FIG. 2, the LCD inspection apparatus also includes a carrier 9 which is mounted to the body 1 such that the carrier 9 is laterally movable. The carrier transfers the LCD panel 10 from the loading/unloading stage 7 to the inspection stage 2, or from the inspection stage 2 to the loading/unloading stage 7.

The inspection stage 2 includes probe units 3, and a worktable 4 which brings the LCD panel 10 into contact with the probe units 3. The worktable 4 also provides light. The worktable 4 includes a polarizing plate 4a and a backlight 4b. A moving stage 5 is arranged at the rear of the worktable 4, to move the worktable 4 such that the worktable 4 is connected to the probe units 3 in a state of being aligned with the probe units 3.

A sub table 8 is mounted to the loading/unloading stage 7. The sub table 8 functions to incline the LCD panel 10 transferred from a loader (not shown) of the loading/unloading stage 7 by a predetermined angle (for example, 60°).

A microscope 6 is mounted to the body 1 in front of the inspection stage 2 such that the microscope 6 is movable in vertical and lateral directions. When it is determined, in a macroscopic inspection operation, that the LCD panel 10 has defects, the operator can more precisely identify the defects of the LCD panel 10, using the microscope 6.

An inspection procedure carried out in the above-mentioned conventional LCD inspection apparatus will now be described.

An LCD panel 10 to be inspected is transferred from the loader (not shown) of the loading/unloading stage 7 to the sub table 8 which, in turn, transfers the LCD panel 10 to the carrier 9 while being inclined by a predetermined angle. Subsequently, the carrier 9 feeds the LCD panel 10 to the inspection stage 2. When the LCD panel 10 is placed in the inspection stage 2, the worktable 4 is moved toward the LCD panel 10 in accordance with operation of the moving stage 5. Thereafter, the worktable 4 vacuum-chucks the LCD panel 10 such that the LCD panel 10 is maintained in a fixed state, and then connects pads (not shown) of the fixed LCD panel 10 to lead pins (not shown) of the probe units 3, respectively.

When electrical connection is achieved between the LCD panel 10 and the probe units 3, as mentioned above, a predetermined image signal from a pattern generator is input to the LCD panel 10 via the probe units 3. The pattern generator, which is an external image signal input unit, sequentially provides various image patterns. When the LCD panel 10 is illuminated by the backlight 4b, such various image patterns are sequentially displayed on the LCD panel 10. Accordingly, the operator can determine whether or not the LCD panel 10 is defective, through the displayed patterns.

However, the above-mentioned conventional LCD inspection apparatus has various problems. When an inspection is to be performed of the LCD panel 10 using the conventional LCD inspection apparatus, the operator first performs a macroscopic inspection with the naked eye, to detect defects present on the LCD panel. However, when fine dust D is attached to the surfaces of upper and lower substrates 11 of the LCD panel 10, as shown in FIG. 3, it is very difficult for the operator to distinguish point defects of pixels from the fine dust D.

Thus, even in the case of non-defective products, the LCD panel may be determined to be defective. For this reason, there are problems of a degradation in yield and loss of manufacturing costs.

In addition, the time taken for one operator to complete a macroscopic inspection of the LCD panel 10 is increased when the LCD panel has an increased size.

The conventional LCD inspection apparatus also has a problem in that detection of defect information of the LCD panel 10 may be omitted because the operator cannot easily identify the defect information.

BRIEF SUMMARY

The present invention is directed to an apparatus and method for inspecting an LCD that substantially obviate one or more problems due to limitations and disadvantages of the related art.

A LCD inspection apparatus is provided that comprises an inspector which photographs images of various patterns displayed on an LCD panel. An image processor receives the images photographed by the automatic inspector, extracts defect information from the received images, and converts the extracted defect information to corresponding data. A pattern generator receives the data from the image processor, sorts the received data in terms of patterns, and controls the LCD panel to display the sorted data.

In another embodiment of the present invention, a liquid crystal display (LCD) inspection method is provided that comprises a pattern display step for displaying images of various patterns on an LCD panel. A defect extraction step is used for extracting information of defects present in the LCD panel from each of the displayed pattern images. A determination step determines a method for displaying the defect information, based on a type of the extracted defect information. A display step displays the defect information on the LCD panel in accordance with the determined display method.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the preferred embodiments of the present invention associated with an LCD inspection apparatus and an LCD inspection method using the same according to the present invention, examples of which are illustrated in the FIGS. 4 to 9. Wherever possible, the same reference numbers will be used throughout the drawings to refer to the same or like parts.

Figure 1:
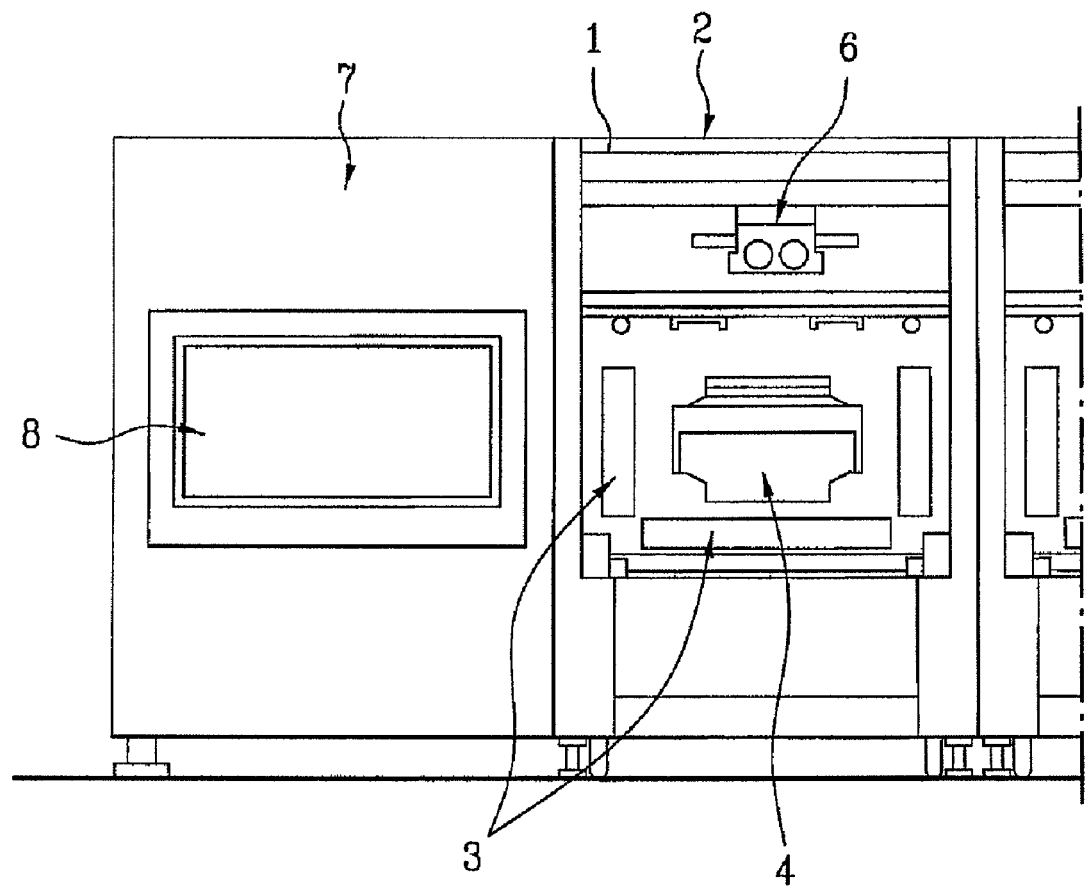
FIG. 1 is a front view schematically illustrating a conventional LCD inspection apparatus.
Figure 2:
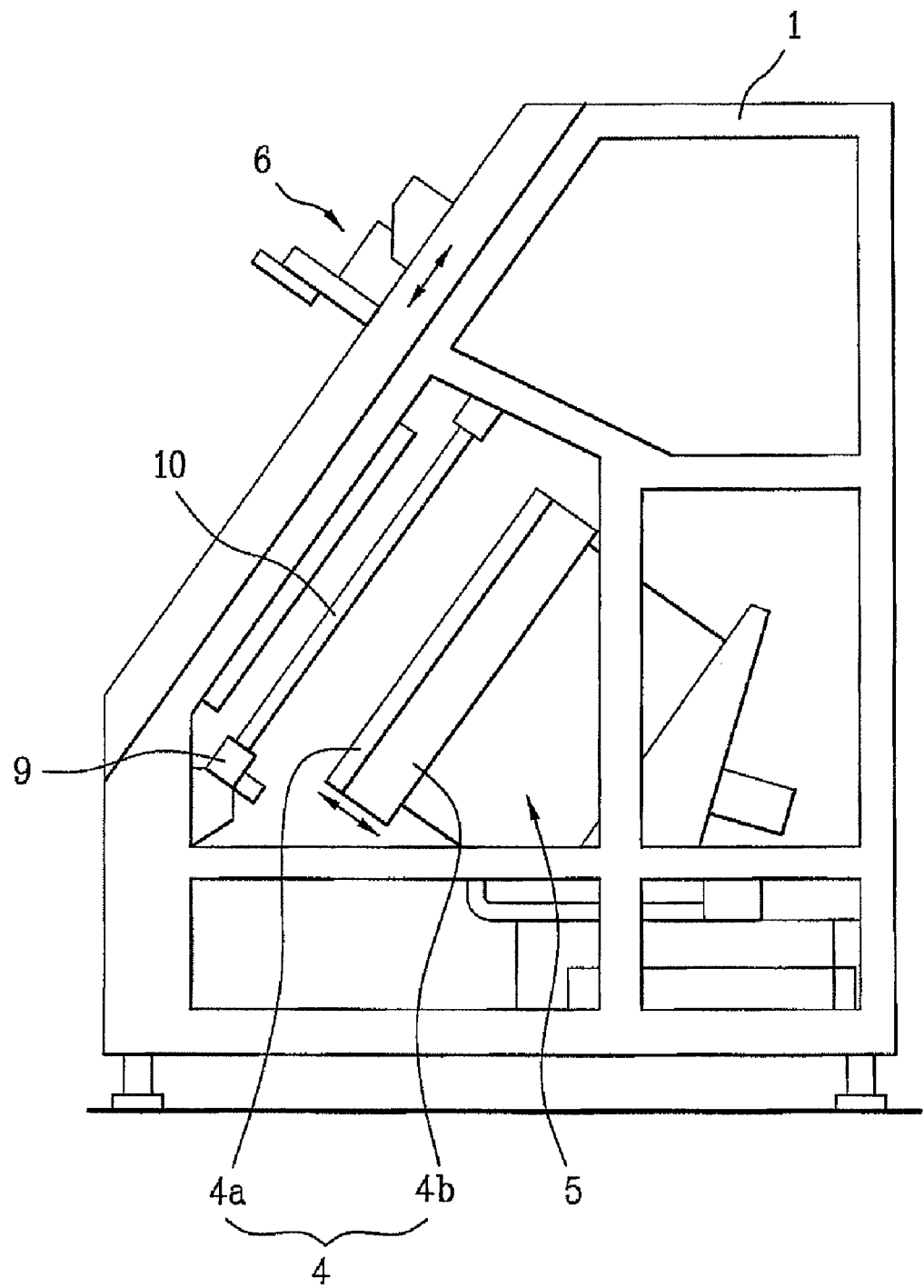
FIG. 2 is a side view of the LCD inspection apparatus shown in FIG. 1.
Figure 3:
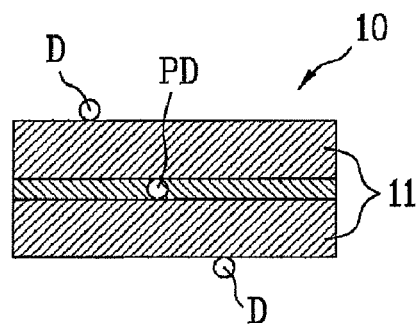
FIG. 3 is a sectional view of an LCD panel according to the related art, illustrating an example of defects on outer surfaces of the LCD panel.
Figure 4:
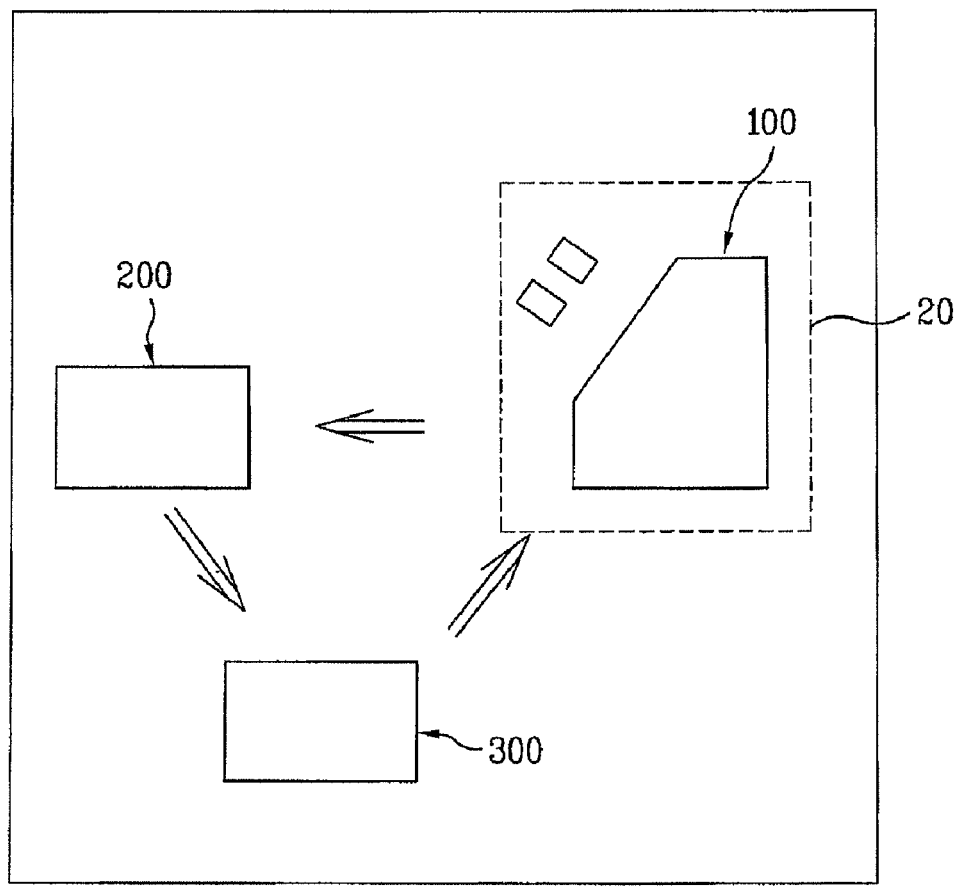
FIG. 4 is a block diagram schematically illustrating a configuration of an LCD inspection apparatus according to a first embodiment of the present invention.

FIG. 4 is a block diagram schematically illustrating a configuration of an LCD inspection apparatus according to a first embodiment of the present invention. As shown in FIG. 4, the LCD inspection apparatus according to the first embodiment of the present invention mainly includes an automatic inspector 100, an image processor 200, and a pattern generator 300.

The image processor 200 receives an image produced by the automatic inspector 100, and extracts defect information from the received image. The image processor 200 is configured to convert the extracted defect information to corresponding data.

Defect information is information that pertains to substantial defects in the LCD panel, and includes information of defects of pixels at particular coordinates, for example, point defects, and information of defects of lines at particular coordinates, for example, line defects.

Based on the defect information, the image processor 200 determines a display method. The image processor 200 subsequently converts information of the determined display method to corresponding displayable data.

The data includes information about the coordinates of the defect information, and display data for displaying the coordinate data.

The determined display method is a method for enabling the operator to clearly distinguish the coordinates of defect information from other coordinates.

The pattern generator 300 receives the coordinate data about defect information and the display data for displaying the coordinate data from the image processor 200. Based on the received data, the pattern generator 300 sorts the defect information in terms of patterns, so as to enable the defect information to be displayed on the LCD panel 10 when the pattern associated with the defect information is photographed.

The automatic inspector 100 functions to photograph images of various patterns displayed on the LCD panel 10. Pattern images are patterns which are predetermined for an inspection of the LCD panel 10, and are sequentially displayed on the LCD panel 10 in the form of images.

Figure 5:
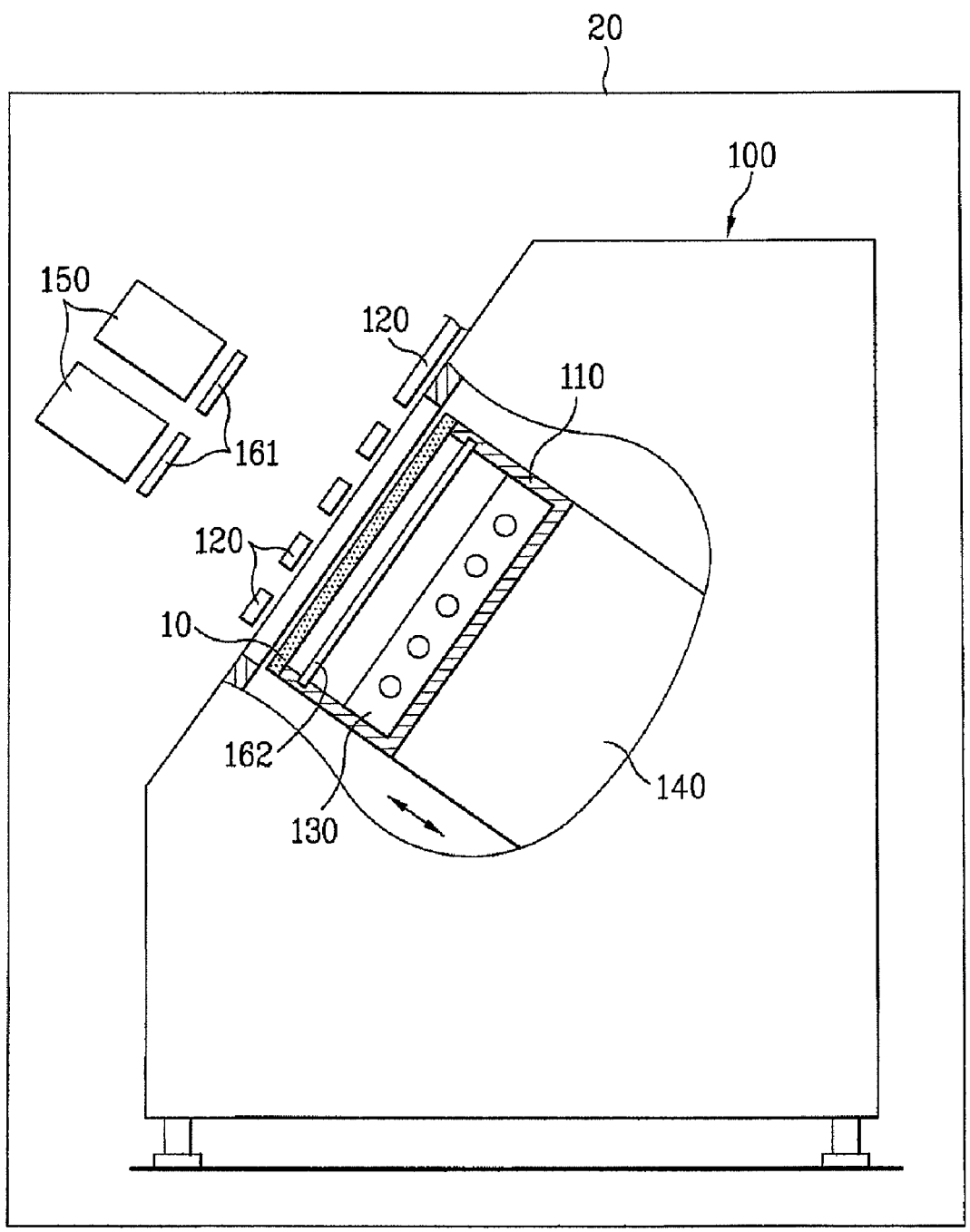
FIG. 5 is a side view schematically illustrating a structure of an automatic inspector included in the LCD inspection apparatus according to the first embodiment of the present invention.

As shown in FIG. 5, the automatic inspector 100 includes a worktable 110, probe units 120, a backlight unit 130, a moving stage 140, an imaging unit 150, and a pair of polarizing plates 161 and 162.

The worktable 110 has a substantially-square hollow box structure which is longitudinally open. The LCD panel 10, which is to be inspected, is seated on the front side of the worktable 110. The front side of the worktable 110 faces the imaging unit 150.

The probe units 120 are electrically connected to pads (not shown) of the LCD panel 10 seated on the worktable 110. The probe units 120 are arranged around the opening of the worktable 110 at the front side of the worktable 110.

A control signal is applied to the LCD panel 10 via the probe units 120. In response to the control signal the LCD panel 10 displays one of various associated pattern images.

The backlight unit 130 is arranged in the worktable 110 to supply light to the LCD panel 10 seated on the front side of the worktable 110. Preferably, the backlight unit 130 includes a lamp which is either a cold fluorescent lamp (CFL), a cold cathode fluorescent lamp (CCFL), an external electrode fluorescent lamp (EEFL), or a high-brightness light emitting diode (LED). It is preferred that the backlight unit 130 be integrated with the worktable 110.

The moving stage 140 is arranged at the rear of the worktable 110. The moving stage 140 functions to align the worktable 110 with the probe units 120, and to connect the worktable 110 to the probe units 120.

The imaging unit 150 is a camera which photographs images of various patterns displayed on the LCD panel 10 seated on the front side of the worktable 110. The imaging unit 150 is spaced apart from the front side of the worktable 110 by a predetermined distance. The imaging unit 150 includes a charge coupled device (CCD) camera. More preferably, the imaging unit 150 includes a CCD camera having a resolution equal to or higher than that of the LCD panel 10.

It may be difficult to photograph the entire region of the LCD panel 10 using one imaging unit 150 when it is taken into consideration that the recent trend of LCD panels is to provide an increased size.

In order to see the entire region of the LCD the first embodiment includes two imaging units 150. The two imaging units 150 are configured to photograph two divided regions of the LCD panel 10, respectively.

For example, one imaging unit 150 is configured to photograph a portion of the LCD panel 10 positioned at the left side with reference to a center line of the LCD panel 10, whereas the other imaging unit 150 is configured to photograph a portion of the LCD panel 10 positioned at the right side with reference to the center line of the LCD panel 10.

The number of imaging units 150 may be three or more in accordance with the size of the LCD panel 10, the spacing of the imaging units 150 from the LCD panel 10, or the resolution of the imaging units 150.

The first polarizing plate 161, is arranged between the imaging unit 150 and the LCD panel 10, to polarize light. On the other hand, the second polarizing plate 162 is arranged between the LCD panel 10 and the backlight unit 130, to polarize light. The first polarizing plate 161 is arranged such that it is adjacent to the imaging unit 150, as compared to the worktable 110. When the first polarizing plate 161 is arranged adjacent to the worktable 110, fine dust or foreign matter attached to the surface of the first polarizing plate 161 may be photographed, and thus, may be recognized as defect information.

It is also preferred that the automatic inspector 100 be shielded from an external illumination environment. If the automatic inspector 100 is installed in a space influenced by external illumination light, the light, which is supplied to the LCD panel 10, may have undesirable characteristics due to influences of room illumination light other than backlight or influences of a shade formed in accordance with movement of the operator.

In the first embodiment of the present invention, the automatic inspector 100 is arranged in a darkroom 20 which is shielded from an external illumination environment.

Figure 6:
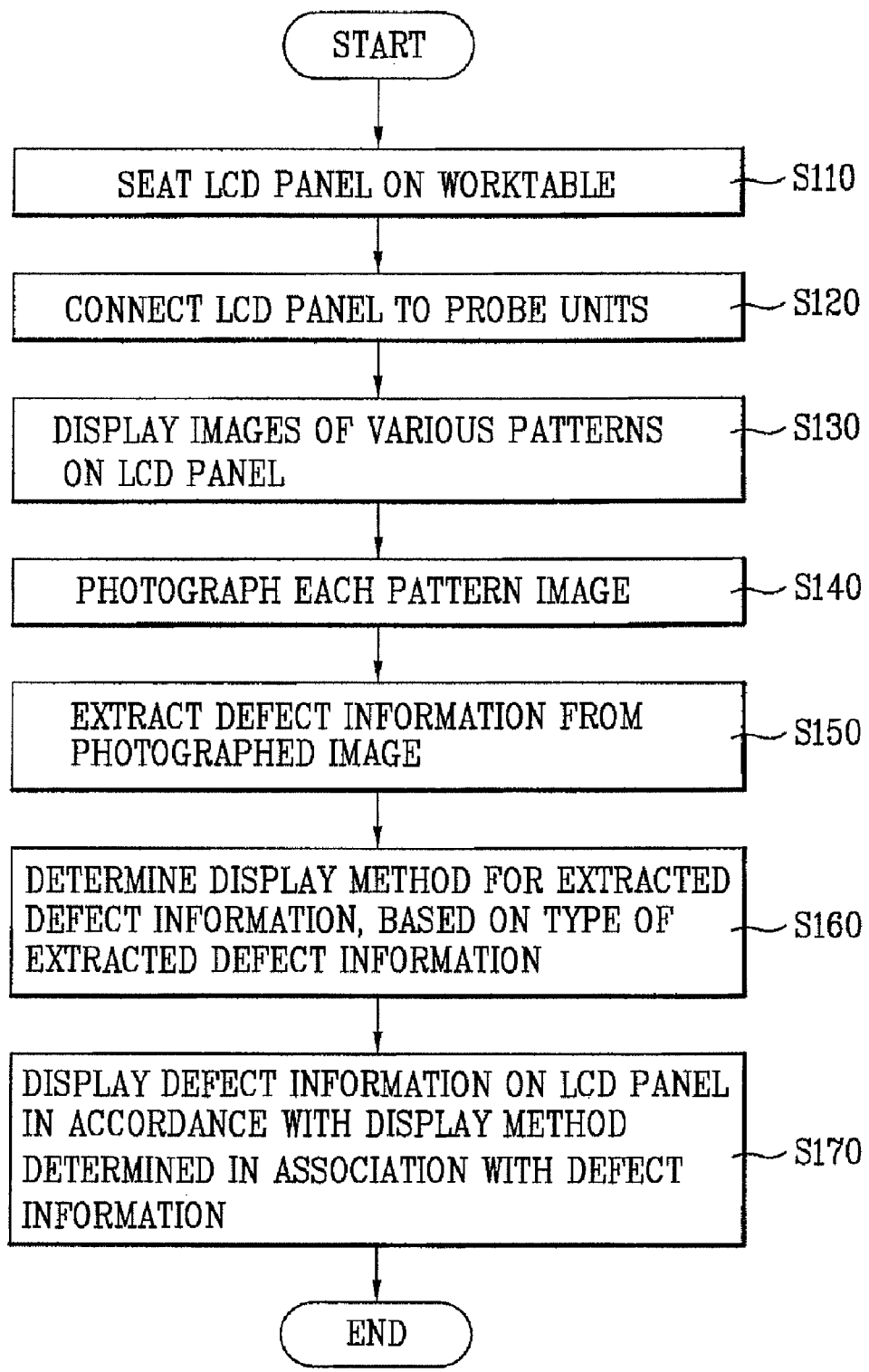
FIG. 6 is a flow chart illustrating an LCD inspection method using the LCD inspection apparatus according the first embodiment of the present invention.

An inspection method for inspecting the LCD panel 10 using the above-described LCD inspection apparatus according to the first embodiment of the present invention will now be described with reference to a flow chart of FIG. 6.

In accordance with the inspection method, the LCD panel 10 is first loaded in the automatic inspector 100 so that various pattern images, which will be sequentially displayed on the LCD panel 10, can be photographed. The LCD panel 10 is loaded on the worktable 110 of the automatic inspector 100, and is then vacuum-chucked such that the LCD panel 10 is seated on the front side of the worktable 110 (S110).

The LCD panel 10 is subjected to a panel bonding process and a singulation process, to have the form of a unit panel. The LCD panel 10 is formed with data shorting pads (not shown) for application of electrical signals to a plurality of data lines, and gate shorting pads (not shown) for application of electrical signals to a plurality of gate lines. The data shorting pads and gate shorting pads are formed on a front surface of the LCD panel 10 along the outer peripheral edges of the LCD panel 10.

After the LCD panel 10 is seated on the worktable 110, the moving stage 140 is driven. In accordance with the driving of the moving stage 140, the worktable 110 is moved forward. As a result, the shorting pads of the LCD panel 10 come into contact with respective lead pins (not shown) of the probe units 120, so they are electrically connected (S120).

When a pattern image signal is output from the pattern generator 300 under the above-described condition, it is supplied to the LCD panel 10 via the probe units 120. At the same time, the backlight unit 130 emits light, to irradiate backlight to the LCD panel 10. Accordingly, a pattern image is displayed on the LCD panel 10. Thus, various pattern images are successively displayed on the LCD panel 10 (S130).

Whenever a pattern image is displayed on the LCD panel 10, the imaging unit 150 photographs the pattern image (S140).

The entire portion of the image displayed on the LCD panel 10 is photographed by one imaging unit 150. Alternatively, two or more divided portions of the image may be photographed by one imaging unit 150. It may also be possible to photograph two or more divided portions of the image by two or more imaging units 150, respectively.

The images photographed by the imaging unit 150 are sent to the image processor 200 which extracts defect information from the photographed images (S150).

The extraction of defect information is achieved by acquiring the coordinates of different pixel patterns among the photographed images.

For example, extraction of defect information is carried out by acquiring the coordinates of defective pixels generated when a pattern for inspection of dark points is displayed on the LCD panel 10, or the coordinates of defective pixels generated when a pattern for inspection of bright points is displayed on the LCD panel 10.

Subsequently, the image processor 200 determines the method for displaying the extracted defect information, based on the type of the extracted defect information (S160).

The defect information is classified, in terms of types, into information of defects of pixels at particular coordinates, for example, point defects, and information of defects of lines at particular coordinates, for example, line defects.

Figure 7:
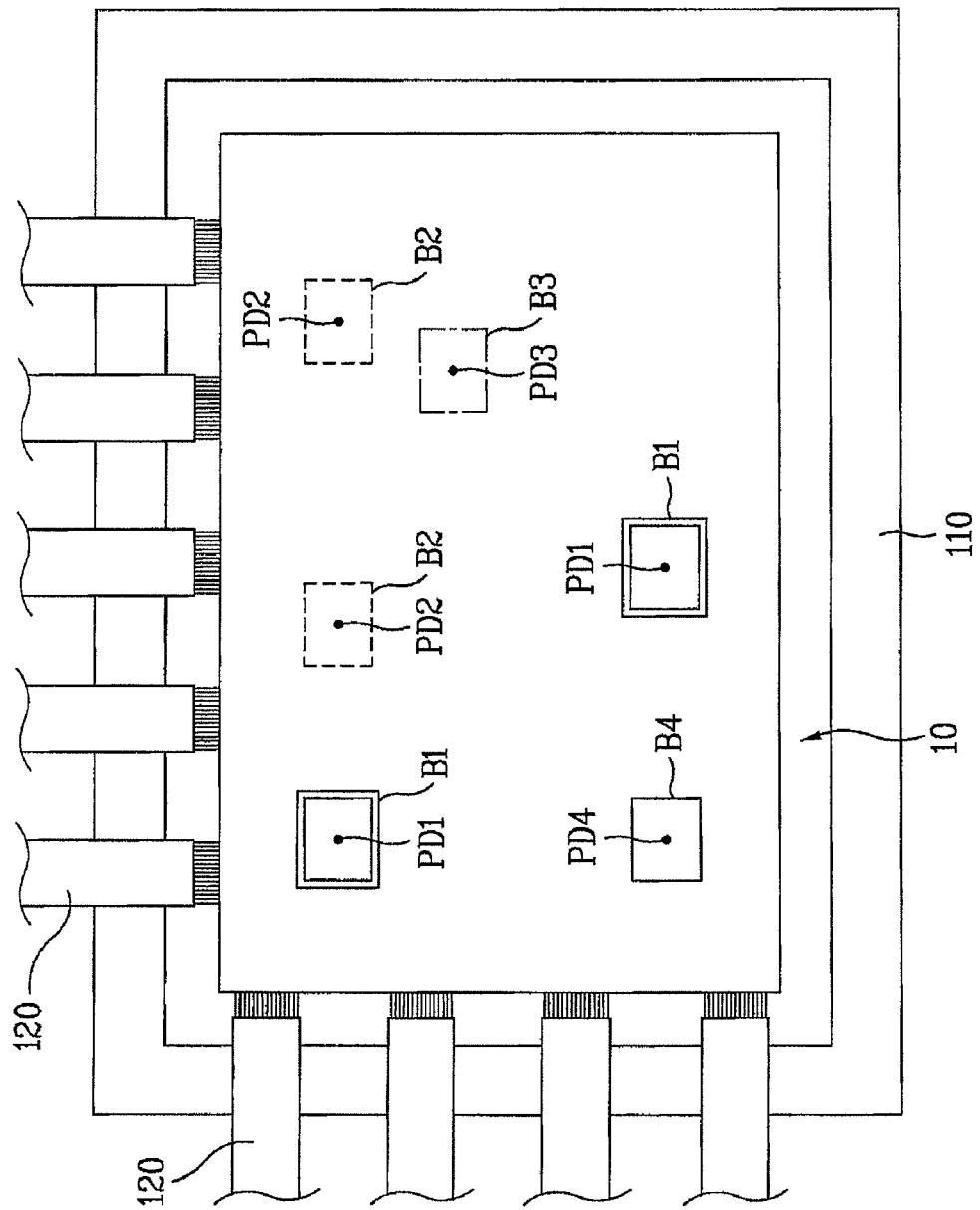
FIG. 7 is a schematic view illustrating an example of display of defect information in an LCD panel inspection procedure according to the first embodiment of the present invention.

In accordance with one defect information display method, as shown in FIG. 7, boxes B1, B2, B3, and B4 are displayed around the coordinates of defects PD1, PD2, PD3, and PD4. Each of the boxes B1, B2, B3, and B4 has a size enabling the user to identify the associated defect through a macroscopic inspection without using a microscope. Preferably, the boxes B1, B2, B3, and B4 may be displayed in different colors, patterns or line-widths respectively corresponding to different types.

Other display methods may be implemented. For example, defect pixels may be brightly displayed, as compared to other pixels. In accordance with another display method, a text may be displayed at the coordinates of defects.

After the method for displaying the defect information is determined based on the type of the defect information in the above-described manner, the image processor 200 converts the information of the determined display method to corresponding data. The converted data is sent to the pattern generator 300. The converted data may be sent to the pattern generator 300 via a controller (not shown).

When a macroscopic inspection of the LCD panel 10 is carried out by the operator in accordance with operation of the automatic inspector 100, the defect information is displayed on the LCD panel 10 in accordance with the display method determined in association with the defect information (S170).

For example, for one defective pixel, a box, which is one of the boxes B1, B2, B3, and B4 respectively having different colors (or different line-widths or different patterns), is displayed around the coordinates of the defective pixel. For one defective line, a line is preferably displayed along the coordinates of the defective line.

The display of defect information may be carried out in various manners. For example, all defect information may be collectively displayed in a single image in accordance with the display methods respectively determined based on the types of the defect information. Alternatively, in a procedure in which images of different patterns are sequentially displayed on the LCD panel, information of defects having the same type may be collectively displayed in accordance with the display method determined based on the type of the defect information when the image having the pattern corresponding to the type of the defect information is displayed. Information of defects, which are grouped into different types, may be selectively or sequentially displayed in the associated images displayed on the LCD panel, in accordance with the types of the defects.

It is preferred that information of all defects PD1, PD2, PD3, and PD4 be collectively displayed in a single image in accordance with the display methods respectively determined based on the types of the defect information (for example, display of boxes B1, B2, B3, and B4 having different shapes), in order to enable the operator to more clearly recognize respective types of the defects PD1, PD2, PD3, and PD4.

The operator can accurately recognize positions of defective pixels or defects of the LCD panel in association with each pattern. Based on the defect information displayed on the LCD panel 10 in accordance with the above-described successive procedures, the operator determines whether or not the LCD panel 10 is defective.

The above-described LCD inspection apparatus and method according to the first embodiment of the present invention may have a problem in that, if a plurality of tasks are sequentially performed in one piece of equipment, the tact time taken for each process is considerably lengthened.

Figure 8:
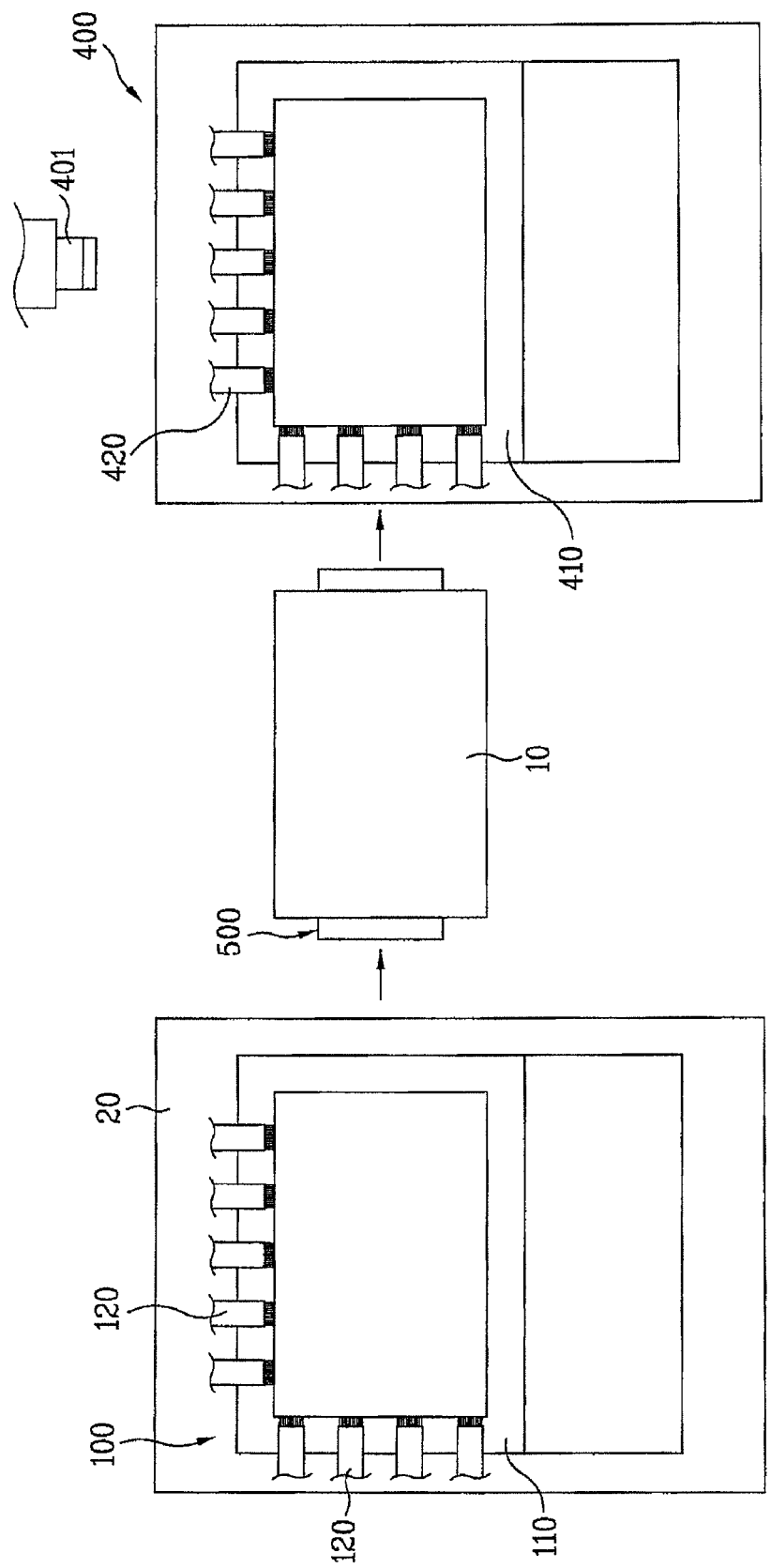
FIG. 8 is a schematic view illustrating an LCD inspection apparatus according to a second embodiment of the present invention.

In accordance with a second embodiment of the present invention, an LCD inspection apparatus is provided which includes a macroscopic inspector 400 and a carrier 500, in addition to the configuration of the LCD inspection apparatus according to the first embodiment, as shown in FIG. 8.

The macroscopic inspector 400 is adapted to enable the operator to inspect each pattern image of the LCD panel with the naked eye. The macroscopic inspector 400 is connected to the pattern generator 300 so that data transmission therebetween is possible.

The macroscopic inspector 400 has a configuration substantially identical to that of the automatic inspector 100, except that the macroscopic inspector 400 does not include the imaging unit 150. Preferably, the macroscopic inspector 400 further includes a microscope 401, in order to enable the operator to more accurately identify defective pixels.

A microscope 401 may also be included in the automatic inspector 100.

The carrier 500 is adapted to receive the LCD panel 10 from the automatic inspector 100, and to transfer the received LCD panel 10 to the macroscopic inspector 400.

Although not shown, a driver is also provided to move the carrier 500. The driver may use a well-known linear driving system. For example, a linear driving system using a ball screw and a servo motor, a linear driving system using a linear motor, or a linear driving system using pulleys, a belt, and a motor may be used.

In accordance with the second embodiment of the present invention, the automatic inspector 100 performs only an automatic inspection, and the macroscopic inspection is carried out using the macroscopic inspector 400. Accordingly, it is possible to greatly reduce the tact time.

In When the macroscopic inspector 400 is used, as described above, the pattern generator 300 enables coordinate data about the defect information and display data for the coordinate data which is received from the image processor 200, to be displayed on the LCD panel 10 in association with each pattern in the macroscopic inspection carried out by the macroscopic inspector 400.

An inspection method for inspecting the LCD panel 10 using the above-described LCD inspection apparatus according to the second embodiment of the present invention will now be described.

In this inspection method, the procedure for photographing each pattern image of the LCD panel 10, the procedure for extracting defect information from the photographed images, and the procedure for determining the display method for the defect information based on the type of the defect information are identical to those of the first embodiment of the present invention.

After an automatic inspection is completed in accordance with the above-described successive procedures, the moving stage 140 of the automatic inspector 100 is driven to rearwardly retract the worktable 110. As a result, the probe units 120 are disconnected from the LCD panel 10.

The LCD panel 10 is transferred to the macroscopic inspector 400 by the carrier 500, and is seated on a front side of a worktable 410 included in the macroscopic inspector 400. Accordingly, the LCD panel 10 is electrically connected to probe units 420 included in the macroscopic inspector 400.

When an image of each pattern is displayed in accordance with the operation of the pattern generator 300, to enable a macroscopic inspection in the macroscopic inspector 400, the defect information associated with the pattern is displayed on the LCD panel 10 in accordance with the display method determined by the image processor 200.

Based on the displayed defect information the operator can accurately identify the positions and types of defective pixels The LCD inspection apparatus according to each of the above-described embodiments of the present invention may be a problem in that fine dust or foreign matter attached to the surfaces of the polarizing plates 161 and 162 or LCD panel 10 may be recognized as defect information. Therefore, it is preferred that information about foreign matter, such as fine dust, which is included in the image photographed by the automatic inspector 100 and supplied to the image processor 200, be excluded from defect information which will be used to identify substantial defects of the LCD panel 10.

Figure 9:
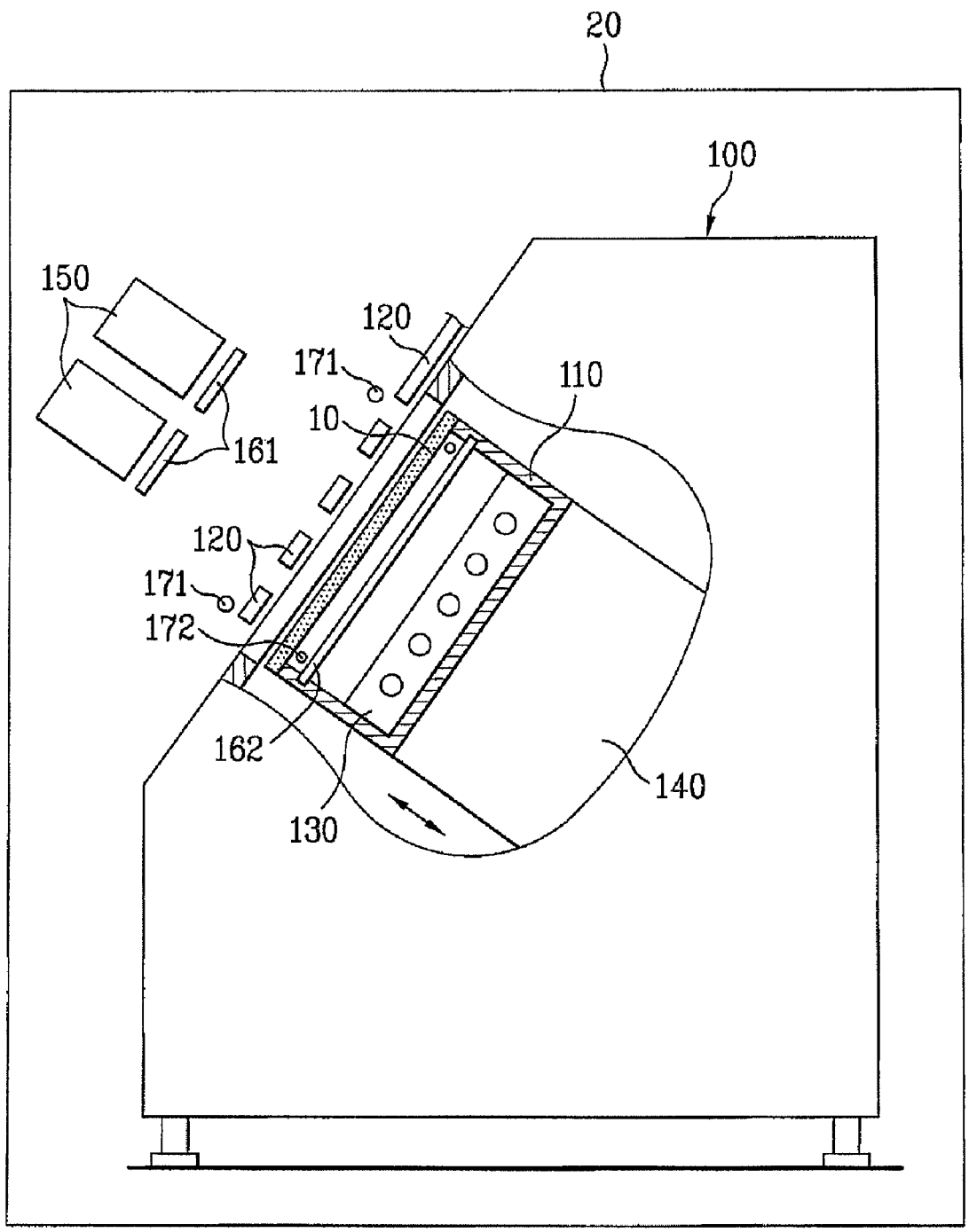
FIG. 9 is a side view schematically illustrating an LCD inspection apparatus according to a third embodiment of the present invention.

In accordance with a third embodiment of the present invention, the automatic inspector 100 further includes illumination units 171 and 172, as shown in FIG. 9.

The illumination units 171 and 172 are arranged between the imaging unit 150 and the backlight unit 130. The illumination units 171 and 172 supply side light to the LCD panel 10, to enable the operator to more easily identify whether or not foreign matter is present on the surfaces of the LCD panel 10.

The illumination units 171 and 172 are arranged along the periphery of the LCD panel 10 seated on the worktable 110, in order to emit illumination light toward the surfaces of the LCD panel 10.

A first one of the illumination units 171 and 172 is adapted to irradiate illumination light from the periphery of the LCD panel 10 at a position forwardly spaced apart from the LCD panel 10 toward a front surface of the LCD panel 10. On the other hand, the second illumination unit 172 is adapted to irradiate illumination light from the periphery of the LCD panel 10 at a position rearwardly spaced apart from the LCD panel 10 toward a back surface of the LCD panel 10.

The first illumination unit 171 is arranged between the first polarizing plate 161 and the worktable 110. The second illumination unit 172 is arranged between the second polarizing plate 162 and the worktable 110. Preferably, each of the illumination units 171 and 172 includes a lamp which is one of a CFL, a CCFL, an EEFL, and a high-brightness LED.

Successive procedures for excluding information about foreign matter such as fine dust from defect information using the illumination units 171 and 172 will be described in detail. It is preferred that the identification of foreign matter using the illumination units 171 and 172 be carried out before the extraction of defect information of pixels by the image processor 200. It is more preferred that the identification of foreign matter using the illumination units 171 and 172 be carried out by performing a photographing operation for the LCD panel 10 at least two times before or after each pattern image displayed on the LCD panel 10 is photographed by the imaging unit 150.

The LCD panel 10 is photographed by the imaging unit 150 in a state in which illumination light is irradiated to the front surface and/or back surface of the LCD panel 10 using the first and second illumination units 171 and 172 under the condition in which light emitted from the backlight unit 130 is shut off. The image photographed in the above procedure does not include images of defective pixels, but includes an image of foreign matter attached to the surfaces of the LCD panel 10 or polarizing plates 161 and 162.

The photographed image is supplied to the image processor 200. The image processor 200 extracts the coordinates of foreign matter from the image supplied to the image processor 200. In a subsequent procedure for extracting the positions of substantial defects of pixels, defect information generated at the coordinates identical to the extracted foreign matter coordinates is deleted. Accordingly, only the information of defective pixels is extracted. As a result, it is possible to achieve an accurate defect inspection of the LCD panel.

The LCD panel 10 can minimize the rate of defects generated in a final testing procedure carried out after the LCD panel 10 is applied to a modular product (for example, after assembly of the LCD panel 10 to a monitor or TV case) because the LCD panel 10 is completely manufactured after the inspection thereof through the above-described inspection method according to each embodiment of the present invention. Accordingly, it is possible to eliminate or minimize assembly of the LCD panel 10, which has defects, to the modular product, and thus, to reduce the manufacturing costs.

The LCD panel 10, which is completely manufactured after the inspection thereof through the above-described inspection method according to each embodiment of the present invention, exhibits a considerably low defect rate, as compared to LCD panels completely manufactured after being inspected through other inspection methods. Thus, the LCD inspection apparatus according to the present invention and the inspection method using the same are useful in that it is possible to accurately inspect defects of the LCD panel 10.

It is possible to accurately determine whether or not the LCD panel 10 is defective, using the LCD inspection method according to the present invention.

As is apparent from the above description, the LCD inspection apparatus and method according to the present invention have various effects.

First, a user may easily and accurately identify the positions of defective pixels of an LCD panel in a procedure for inspecting defects of the LCD panel. Accordingly, it is possible to achieve a reduction in inspection time, an accurate inspection, and an enhancement in yield.

Second, since the LCD inspection apparatus of the present invention includes an automatic inspector and a macroscopic inspector in order to separately perform an automatic defect inspection of the LCD panel and a macroscopic defect inspection of the LCD panel by the operator, there is an effect capable of minimizing the tact time taken for inspection of the LCD panel.

Third, since defect information is identified as foreign matter, such as fine dust, attached to the surfaces of the LCD panel, the defect information can be excluded from information of substantial pixel defects, there is an effect capable of achieving a very accurate defect inspection.

Fourth, since the LCD inspection apparatus of the present invention can include a plurality of imaging units, an inspection of the entire region of the LCD panel, irrespective of the size of the LCD panel is possible.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A liquid crystal display (LCD) inspection apparatus comprising:
    an inspector that photographs images of various patterns displayed on an LCD panel;
    an image processor that receives the images photographed by the inspector, extracts defect information from the received images, and converts the extracted defect information to corresponding data;
    a pattern generator that receives the data from the image processor, sorts the received data, and displays the sorted data;
    a first illumination unit that is arranged between the first polarizing plate and the worktable, and is adapted to irradiate illumination light from the periphery of the LCD panel at a position forwardly spaced apart from the LCD panel toward a front surface of the LCD panel; and
    a second illumination unit that is arranged between the second polarizing plate and the worktable, and is adapted to irradiate illumination light from the periphery of the LCD panel at a position rearwardly spaced apart from the LCD panel toward a back surface of the LCD panel, wherein a foreign matter identification step for photographing an image of the LCD panel is accomplished in a state in which illumination light is irradiated to a front surface and/or a rear surface of the LCD panel using the first and second illumination units under a condition in which light emitted from a backlight unit toward the LCD panel is shut off,
    wherein the image processor deletes extract information about coordinates of foreign matter from the image photographed at the foreign matter identification step when extracting defect information, thereby extracting defect information alone.

2. The LCD inspection apparatus according to claim 1, wherein the pattern generator sorts the received data in terms of patterns.

3. The LCD inspection apparatus according to claim 1, wherein the inspector includes:
    a worktable on which the LCD panel is disposed;
    probe units that are electrically connected to pads of the LCD panel disposed on the worktable;
    the backlight unit that supplies light to the LCD panel seated on the worktable;
    at least one imaging unit that photographs an image of the LCD panel seated on the worktable;
    a first polarizing plate that is arranged between the imaging unit and the LCD panel, to polarize the light;
    a second polarizing plate that is arranged between the LCD panel and the backlight unit, to polarize the light.

4. The LCD inspection apparatus according to claim 2, wherein the at least one imaging unit includes at least two imaging units that photographs at least two divided regions of the LCD panel.

5. The LCD inspection apparatus according to claim 3, wherein the number of the imaging units is determined depending on a size of the LCD panel, a spacing of the imaging units from the LCD panel, or a resolution of the imaging units.

6. The LCD inspection apparatus according to claim 2, wherein the first polarizing plate is arranged adjacent to the imaging unit, as compared to the worktable.

7. The LCD inspection apparatus according to claim 1, wherein the automatic inspector is installed in a darkroom which is shielded from an external illumination environment.

8. The LCD inspection apparatus according to claim 1, further comprising:
   a macroscopic inspector that macroscopically inspects each pattern image of the LCD panel; and
   a carrier which receives the LCD panel from the automatic inspector, and transfers the received LCD panel to the macroscopic inspector,
   wherein the pattern generator is controlled to sort the defect information in terms of patterns in the macroscopic inspection carried out by the macroscopic inspector.

9. The LCD inspection apparatus according to claim 4, further comprising:
   a macroscopic inspector that macroscopically inspects each pattern image of the LCD panel; and
   a carrier which receives the LCD panel from the automatic inspector, and transfers the received LCD panel to the macroscopic inspector,
   wherein the pattern generator is controlled to sort the defect information in terms of patterns in the macroscopic inspection carried out by the macroscopic inspector.

* * * * *